United States Patent
Ahn et al.

(10) Patent No.: US 9,158,899 B2
(45) Date of Patent: Oct. 13, 2015

(54) TERMINAL APPARATUS WITH DRM DECODING FUNCTION AND DRM DECODING METHOD IN TERMINAL APPARATUS

(71) Applicant: INKA ENTWORKS, INC., Seoul (KR)

(72) Inventors: Sung Min Ahn, Seoul (KR); Jung Geun Park, Seoul (KR); Jin Seon Hong, Seoul (KR); Woon Sang An, Osan-Si (KR); Sung Woo Lee, Seoul (KR)

(73) Assignee: INKA ENTWORKS, INC., Seoul (KR)

( * ) Notice: Subject to any disclaimer, the term of this patent is extended or adjusted under 35 U.S.C. 154(b) by 0 days.

(21) Appl. No.: 13/666,406

(22) Filed: Nov. 1, 2012

(65) Prior Publication Data
US 2014/0123297 A1    May 1, 2014

(51) Int. Cl.
| | |
|---|---|
| *G06F 7/04* | (2006.01) |
| *G06F 17/30* | (2006.01) |
| *H04N 7/16* | (2011.01) |
| *G06F 21/10* | (2013.01) |
| *H04N 21/254* | (2011.01) |

(52) U.S. Cl.
CPC ............ *G06F 21/10* (2013.01); *H04N 21/2541* (2013.01)

(58) Field of Classification Search
CPC ............... G06F 21/10; G11B 20/00086; H04L 2463/101; H04N 5/913; H04N 21/4627; H04N 21/2541

USPC ........................ 726/26–33; 713/187
See application file for complete search history.

(56) References Cited

U.S. PATENT DOCUMENTS

| | | | |
|---|---|---|---|
| 6,195,650 B1 * | 2/2001 | Gaither et al. ......... 707/999.001 |
| 7,681,238 B2 * | 3/2010 | Plastina et al. ................... 726/26 |
| 7,908,652 B1 * | 3/2011 | Austin et al. ..................... 726/22 |
| 2002/0178271 A1 * | 11/2002 | Graham et al. ............... 709/229 |
| 2004/0213273 A1 * | 10/2004 | Ma ................................. 370/401 |
| 2012/0124642 A1 * | 5/2012 | Lee et al. ........................... 726/1 |
| 2012/0284804 A1 * | 11/2012 | Lindquist et al. ............... 726/29 |
| 2013/0024933 A1 * | 1/2013 | Jakobsson et al. ............... 726/22 |
| 2013/0166906 A1 * | 6/2013 | Swaminathan et al. ....... 713/155 |

* cited by examiner

*Primary Examiner* — Dede Zecher
*Assistant Examiner* — Vadim Savenkov
(74) *Attorney, Agent, or Firm* — Nixon & Vanderhye PC

(57) ABSTRACT

Provided is a terminal apparatus with a DRM decoding function and a DRM decoding method in a terminal apparatus. The terminal apparatus with a DRM decoding function comprises a native unit which is provided with a local file memory for storing DRM media content data and an application program for driving a media device player using an operating system; and a DRM decoding unit which reads the DRM media content data from the local file memory using a URL path for web server, when it is required from the application program to reproduce the DRM media content data, and decodes the read DRM media content data, and provides the decoded DRM media content data to the media device player. Therefore, it is possible to reproduce the DRM media content data in the terminal apparatus without the exclusive DRM decoding module.

15 Claims, 3 Drawing Sheets

TERMINAL APPARATUS WITH DRM DECODING FUNCTION AND DRM DECODING METHOD IN TERMINAL APPARATUS

TECHNICAL FIELD

The present invention relates to a terminal apparatus with a DRM decoding function and a DRM decoding method in a terminal apparatus, and particularly to a terminal apparatus with a DRM decoding function, which has a local web server module therein and decodes DRM media content data stored in the terminal apparatus using a URL path for web server, and a DRM decoding method in a terminal apparatus.

BACKGROUND OF THE INVENTION

DRM (Digital Rights Management) is a technology for managing the copyright of digital contents and also preventing the digital media contents from being illegally used. The DRM can provide a strong level of security based on an encryption technique of various kinds of media content protection techniques and also can support various business models, and thus it has been applied to various media content service areas such as music, video, e-Book and e-Learning since the early 2000s.

Meanwhile, a terminal apparatus with an operating system is being propagated rapidly, and IPHONE of APPLE INC. and ANDROID phone running GOOGLE's ANDROID operating system are the representative terminal apparatuses.

However, when supporting the DRM of audio/video media contents in the terminal apparatus with such operating system, it is not possible to apply a decoding module used in a general PC (Personal Computer) environment. Therefore, an exclusive DRM decoding module is directly built in the terminal apparatus. A typical example thereof is FAIRPLAY of APPLE INC.

The FAIRPLAY as a DRM technique made by APPLE INC. is built in QUICKTIME multimedia software and used in IPHONE, IPOD, and ITUNES. The media contents of APPLE INC. can be purchased on the ITUNES store. Since the media contents are provided in the state of being encrypted by the FAIRPLAY, they cannot be decoded in other unauthorized terminal apparatuses except IPHONE, IPOD, and ITUNES of APPLE INC.

However, in case of the exclusive DRM decoding module which is directly built in the operating system, it is difficult to change source code of a built-in media device player or add a function due to the nature of operating system. Therefore, there is a requirement for a new DRM decoding technique which can use its own function and supported codec of the media device player regardless of a version of the operating system of the terminal apparatus.

SUMMARY OF THE INVENTION

An object of the present invention is to provide a terminal apparatus with a DRM decoding function, which has a local web server module therein and decodes DRM media content data stored in the terminal apparatus using a URL path for web server, and a DRM decoding method in a terminal apparatus.

To achieve the object of the present invention, the present invention provides a terminal apparatus with a DRM decoding function comprising a native unit which is provided with a local file memory for storing DRM media content data and an application program for driving a media device player using an operating system; and a DRM decoding unit which reads the DRM media content data from the local file memory using a URL path for web server, when it is required from the application program to reproduce the DRM media content data, and decodes the read DRM media content data, and provides the decoded DRM media content data to the media device player.

Preferably, the DRM decoding unit converts a local file path of the DRM media content data into a URL path for web server, when it is required from the application program to reproduce the DRM media content data, and provides it to the media device player, and inversely converts the URL path for web server into the physical local file path of the DRM media content data, when it is required from the media device player to reproduce the DRM media content data, reads the DRM media content data from the local file memory, decodes the read DRM media content data and then provides the decoded DRM media content data to the media device player.

Preferably, the DRM decoding unit comprises a decoding module part which decodes the DRM media content data; a resource manager part which converts the local file path of the DRM media content data into the URL path for web server and then manages it; and a web server module part which receives the local file path of the DRM media content data corresponding to the URL path for web server, when it is required from the media device player to reproduce the DRM media content data, reads the DRM media content data from the local file memory, decodes the read DRM media content data using the decoding module, and then provides the decoded DRM media content data to the media device player.

Preferably, the web server module part comprises a request handler which provides the decoded media content data and HTTP response information in response to an HTTP (Hyper Text Transfer Protocol) range request from the media device player; and a file manager receives from the resource manager part the local file path of the DRM media content data corresponding to the URL path for web server, when the requirement for reproducing the DRM media content data is included in the HTTP range request, reads the DRM media content data from the local file memory, decodes the read DRM media content data using the decoding module, and then returns the decoded DRM media content data to the request handler.

Preferably, the request handler checks validity of the URL path for web server including GUID (Globally Unique Identifier), as an OTP (OneTime Password) concept which is changed whenever the DRM media content data is reproduced.

Preferably, the DRM decoding unit further comprises a license manager part which manages a license for the DRM media content data; and a media player controller part which performs the reproducing and controlling of the media device player, wherein the resource manager part provides the local file path of the DRM media content data to the license manager part so as to check whether there is a license, and then requests the reproduction of the URL path for web server to the media player controller part, when the license for the DRM media content data is normal.

Preferably, the decoding module part requests the checking of the license to the license manager part, when the read DRM media content data is received from the web server module part, receives a desired encryption key and then decodes the read DRM media content data.

Preferably, the DRM decoding unit further comprises a download manger part which downloads the DRM media content data from an external server and then stores it in the local file memory, and when it is required from the application program to reproduce the DRM media content data, the web server module part checks whether the download manager part completely downloads the corresponding DRM media content data before reading the corresponding DRM media content data.

Preferably, the DRM decoding unit further comprises a security manager part which checks whether the terminal apparatus is operated abnormally and then controls the DRM media content data read from the decoding module part so as to be decoded or not decoded according to security rules, when the terminal apparatus is operated abnormally.

Preferably, the web server module part calls the security manager part, when it is required from the media device player to reproduce the DRM media content data, and controls the DRM media content data read from the decoding module part so as to be not decoded, when packet sniffing that taps the networking traffic in a loopback environment is detected.

Further, the present invention provides a DRM decoding method in a terminal apparatus which is provided with a local file memory for storing DRM media content data and an application program for driving a media device player using an operating system, comprising a decoding step, using a URL path for web server, of reading the DRM media content data from the local file memory using the URL path for web server, when it is required from the application program to reproduce the DRM media content data, decoding the read DRM media content data and then providing the decoded DRM media content data to the media device player.

Preferably, the decoding step using the URL path for web server comprises converting a local file path of the DRM media content data into the URL path for web server, when it is required from the application program to reproduce the DRM media content data and then providing it to the media device player; inversely converting the URL path for web server into the local file path of the DRM media content data, when it is required from the media device player to reproduce the DRM media content data, reading the DRM media content data from the local file memory and then decoding the read DRM media content data; and providing the decoded DRM media content data to the media device player.

[Detailed Description of Main Elements]

| | |
|---|---|
| 110: content providing server | |
| 120: license issuing server | 130: PC |
| 140: terminal apparatus with operating system | |
| 150: native unit | 152: application program |
| 154: media device player | 156: local file memory |
| 160: DRM decoding unit | 162: decoding core |
| 164: web module part | 166: decoding module part |
| 168: license storage | |

DESCRIPTION OF SPECIFIC EMBODIMENTS

The advantages, features and aspects of the invention will become apparent from the following description of the embodiments with reference to the accompanying drawings, which is set forth hereinafter.

Figure 1:
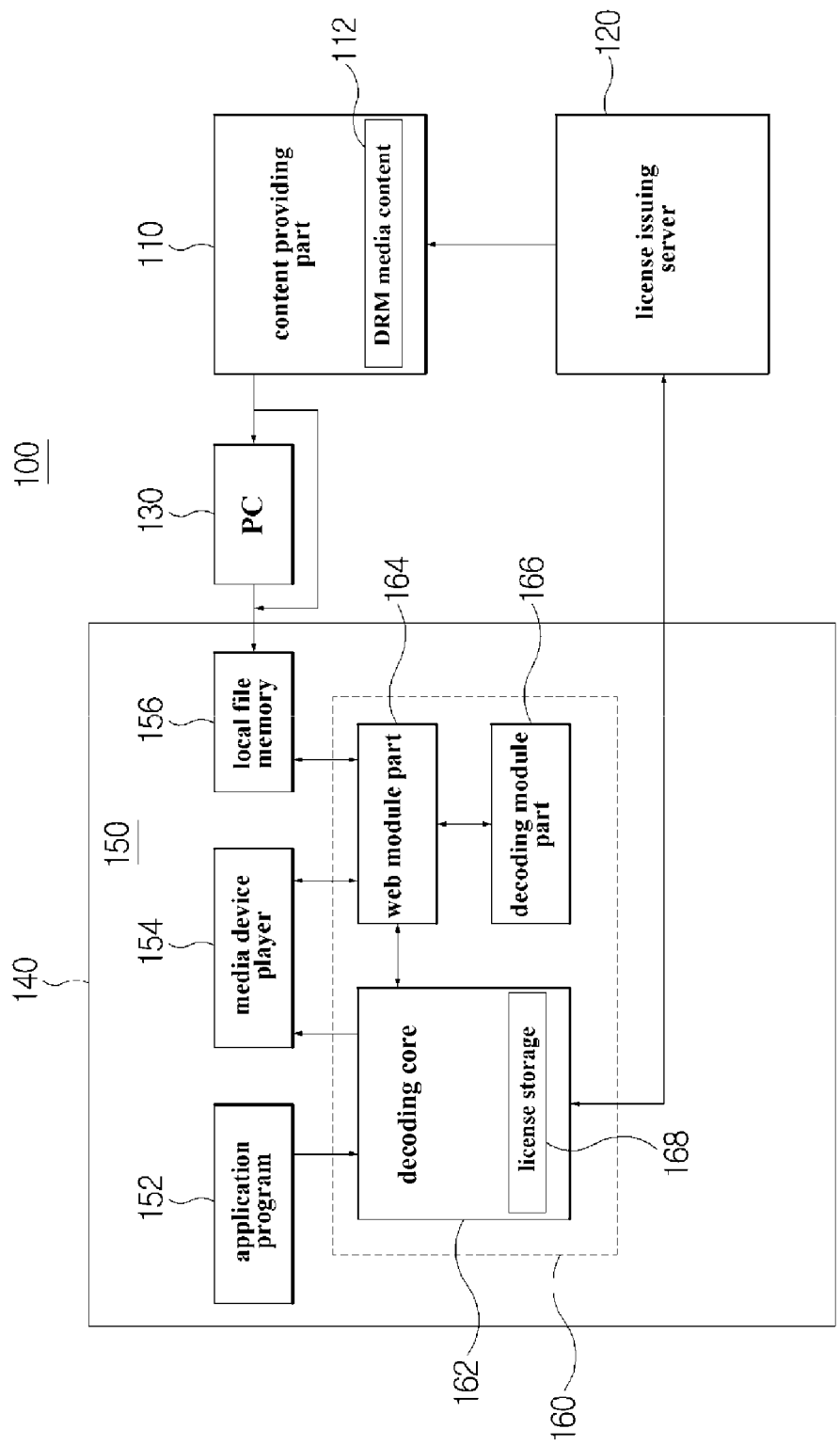
FIG. 1 is a schematic block diagram of a DRM system associated with a terminal apparatus according to an embodiment of the present invention.

FIG. 1 is a schematic block diagram of a DRM system associated with a terminal apparatus according to an embodiment of the present invention.

As shown in FIG. 1, a DRM system 100 associated with a terminal apparatus includes a content providing server 110, a license issuing server 120, a PC (Personal Computer) 130 and a terminal apparatus 140 with an operating system.

The content providing server 110 stores DRM (Digital Rights Management) media contents 112 to be provided to users, which are encrypted by using an encryption key provided from the license issuing server 120.

The license issuing server 120 generates and issues a license for the DRM media contents 112 stored in the content providing server 110.

The PC 130 can be connected to the content providing server 110 through Internet, and a user is connected to the content providing server 110 through a log-in process and then downloads and stores the DRM media contents.

The terminal apparatus 140 with the operating system includes a native unit 150 for carrying out general functions of the terminal apparatus, and a DRM decoding unit 160 for decoding the DRM media contents. The terminal apparatus 140 with the operating system may be IPHONE of APPLE INC. and ANDROID phone with GOOGLE's ANDROID operating system.

The native unit 150 includes a plurality of application programs 152, a media device player 154 and a local file memory 156. When the user runs an application program 152 relevant to download, the native unit 150 downloads the DRM media contents stored in the PC 130 through USB (Universal Series Bus) and stores it as DRM media content data in the local file memory 156, or downloads the DRM media contents stored in the content providing server 110 via WiFi or the like and stores it as DRM media content data in the local file memory 156. The media device player may be MP Movie Player, AV Player (iOS+4), Audio Queue or the like.

The DRM decoding unit 160 includes a decoding core 162, a web server module part 164 and a decoding module part 166.

When it is required from the application program 152 to reproduce the DRM media content data stored in the local file memory 156, the decoding core 162 checks whether there is a license for the required DRM media content data in a license storage 168. If there is not the license for the required DRM media content data, the decoding core 162 is connected to the license issuing server 120 via the native unit 150. In this case, a secure channel is formed between the terminal apparatus 140 and the license issuing server 120 using a diffie-helman key distribution algorithm. The terminal apparatus 140 transmits a single identifier of the terminal apparatus 140 to the license issuing server 120, and the license issuing server 120 transmits a device-binding license using the single identifier of the terminal apparatus 140. The terminal apparatus 140 stores the device-binding license transmitted from the license issuing server 120 in the license storage 168. If there is the license for the required DRM media content data, the decoding core 162 converts the a physical local file path of the DRM media content data stored in the local file memory 156 into a virtual URL (Uniform Resource Locator) path for web server and then provides it to the media device player 154.

When it is required from the media device player 154 to reproduce the DRM media content data stored in the local file memory 156, the web server module part 164 inversely converts the URL path for web server into the physical local file path of the DRM media content data stored in the local file memory 156, reads the DRM media content data stored in the local file memory 156 using the physical local file path, decodes the read DRM media content data using the decoding module part 166 and then provides it to the media device player 154.

The decoding module part 166 decodes the DRM media content data provided from the web server module part 164. Herein, the decoding module part 166 decodes the DRM media content data using desired encryption key (CEK) information from the license storage 168.

Figure 2:
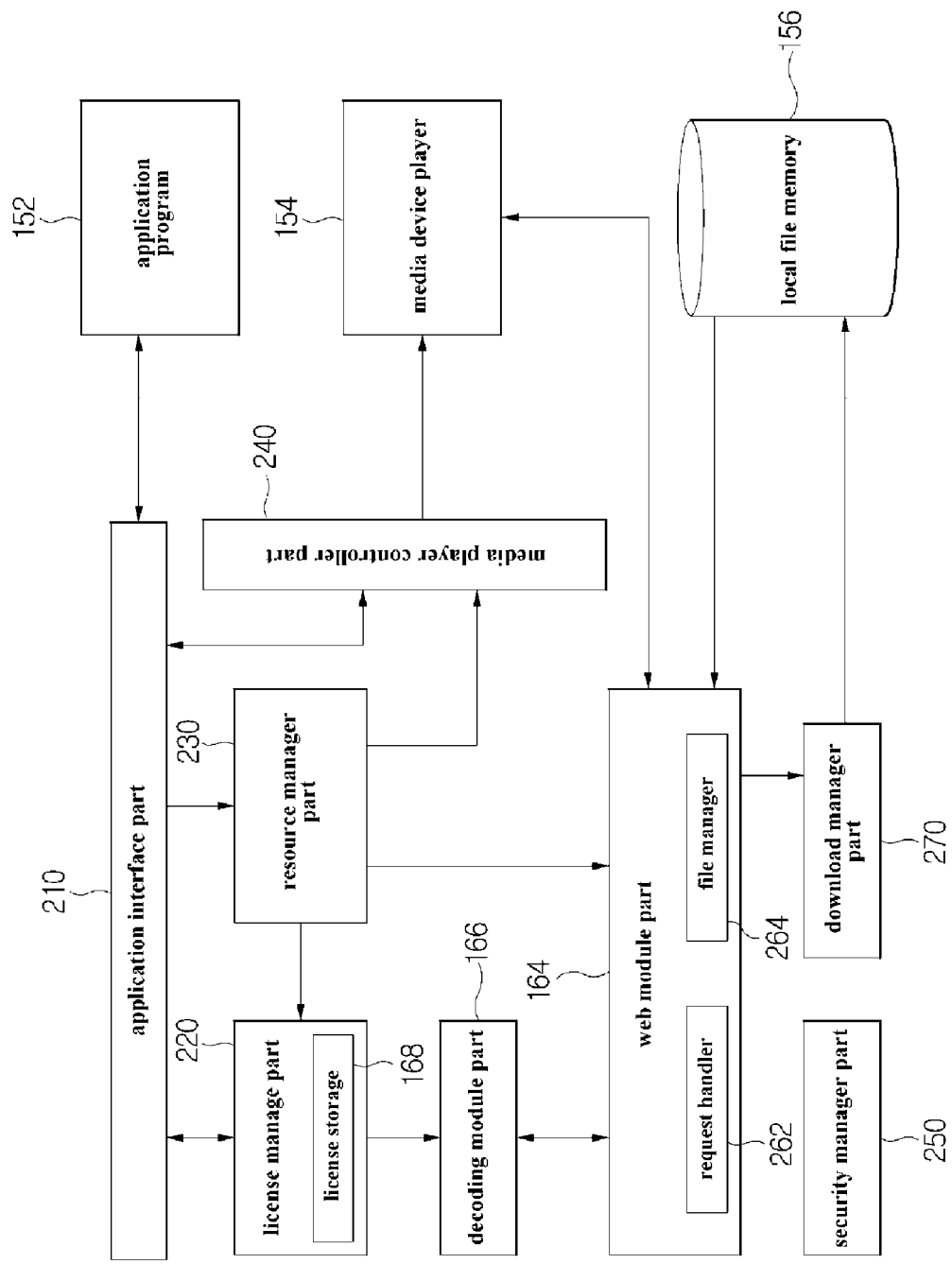
FIG. 2 is a block diagram of a DRM decoding unit shown in FIG. 1.

FIG. 2 is a block diagram of the DRM decoding unit shown in FIG. 1.

As shown in FIG. 2, the DRM decoding unit 160 includes an application interface part 210, a license manager part 220, a resource manager part 230, a media player controller part 240, the decoding module part 166, the web server module part 164, a security manager part 250 and a download manager part 270.

The application interface part 210 is to process the requirement for reproducing the DRM media content data stored in the local file memory 156 by the application program 152. When it is required from the application program 152 to reproduce the DRM media content data stored in the local file memory 156, the application interface part 210 provides interface functions which can call and control various functions for playing the media device player 154 and also functions to transmit various events associated with the playing of the media device player 154 to the application program 152.

The license manager part 220 includes the license storage 168 and is connected with the license issuing server 120 via the application interface part 210. The license manager part 220 performs issuing and renewing of the license for the DRM media content, when it is connected with the license issuing server 120. When it is required through the application interface part 210 to reproduce the DRM media content data, the license manager part 220 checks whether there is a license for the DRM media content data. If a license period is expired, or the number of reproduction times reaches the licensed number, the license manager part 220 invalidates the license for the DRM media content data.

The resource manager part 230 converts the physical local file path of the DRM media contents stored in the local file memory 156 into the URL path for web server and then manages it. When it is required from the application program 152 through the application interface part 210 to reproduce the DRM media content data stored in the local file memory 156, the resource manager part 230 converts the physical local file path of the required DRM media contents into the URL path for web server and then provides it to the media player controller part 240.

Further, the resource manager part 230 provides the local file path of the required DRM media contents to the license manager part 230 and also requests checking and issuing of the license for the required DRM media content data. Furthermore, if the license for the required DRM media content data is confirmed, the resource manager part 230 provides the URL path for web server to the media player controller part 240.

The media player controller part 240 generates a media device player object and performs reproduction and control of media contents. The media player controller part 240 executes a command of the application program 152 relevant to the media device player 154 and transmits an event generated from the media device player 154 to the application interface part 210. Further, if a command such as pausing, location searching, controlling of reproduction speed and stopping of reproduction is input from the application program 152 via the application interface part 210, the media player controller part 240 controls the media device player 154 according to the command.

The decoding module part 166 decodes the required DRM media content data read from the local file memory 156. The decoding module part 166 requests checking of the license to the license manager part 220, and then decodes the requested DRM media content data using the desired encryption key (CEK) information from the license manager part 220.

The web server module part 164 functions to return corresponding data of the required DRM media content in response to an HTTP (Hyper Text Transfer Protocol) range request from the resource manager part 230.

When it is required from the media device player 154 to reproduce the DRM media content data, the web server module part 164 receives from the resource manager part 230 the local file path of the required DRM media content data corresponding to the URL path for web server. The web server module part 164 reads the required DRM media content data stored in the local file memory 156 using the local file path of the required DRM media content data. The web server module part 164 provides the DRM media content data read from the local file memory 156 to the decoding module part 166, and the media content data decoded by the decoding module part 166 is output to the media device player 154.

The web server module part 164 may include a request handler 262 and a file manager 264. The request handler 262 handles the requirement of HTTP request, checks the validity of the URL path for web server including GUID (Globally Unique Identifier), as an OTP (OneTime Password) concept which is changed whenever the DRM media content data is reproduced, and then provides HTTP response information and decoded media content data. If the requirement for DRM content data of a specific resource is included in the requirement for the HTTP request, the file manager 264 converts the URL path for web server into the corresponding to local file path via the resource manager part 230, reads the DRM media content data, decodes it through the decoding module part 166 and then returns the decoded media content data.

The security manager part 250 checks whether the terminal apparatus is operated abnormally, i.e., whether an administrator right is acquired by illegally releasing or hacking a locking device of IPHONE of APPLE INC. or the ANDROID operating system. If the terminal apparatus is operated abnormally, the security manager part 250 controls the decoding module part 166 so that the decoding operation is not carried out. In this case, if the decoding operation is allowed under security rules, the decoding module part 166 can be controlled to perform the decoding operation of the read DRM media content data.

Further, when packet sniffing that taps the networking traffic in a loopback environment is detected, the decoded media content data transmitted to the media device player 154 through the web server module part 164 may be leaked. Therefore, the security manager part 250 controls the decoding module part 166 so that the decoding operation is not carried out.

In case of a remote reproduction mode, the download manager part 270 downloads and manages the DRM media content data of an external server, e.g., the content providing server 110. In other words, when reproducing the DRM media content data of the external server, not the DRM media content data stored in the local file memory 156, the download manager part 270 functions to store the corresponding DRM media content data in the local file memory 156. In case of a reproduction mode of remote file data (progressive download or download & play), the file manager 264 of the web server module part 164 checks whether the download manager part 270 completely downloads the required DRM media content data before reading the required DRM media content data. If the downloading operation is not completed, the file manager 264 is on standby.

Figure 3:
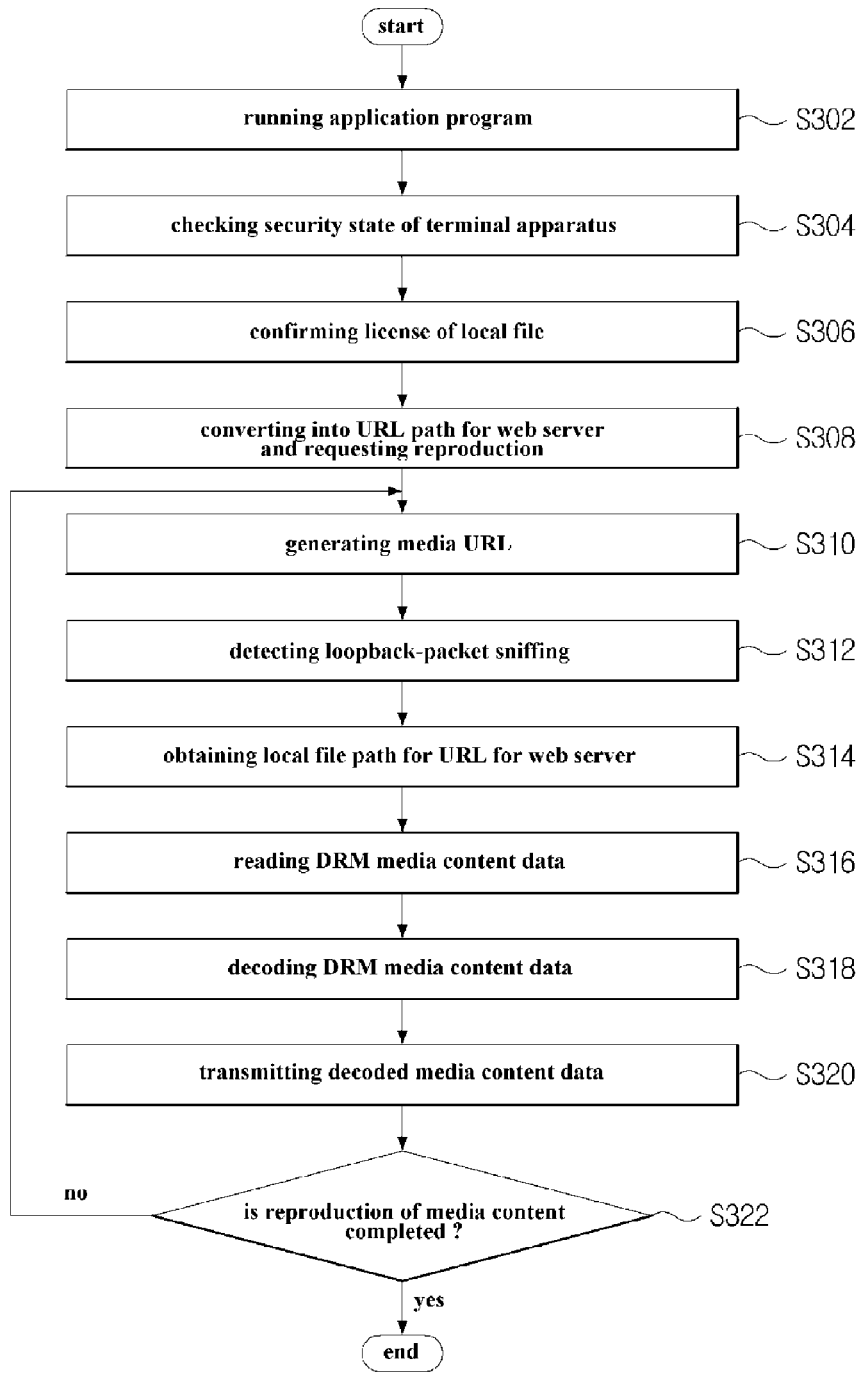
FIG. 3 is a flow chart of a DRM decoding method in the terminal apparatus according to the embodiment of the present invention.

FIG. 3 is a flow chart of a DRM decoding method in the terminal apparatus according to the embodiment of the present invention.

A user runs the application program 152 associated with the reproduction of contents stored in the terminal apparatus (S302). If the user selects and clicks desired DRM media content data, e.g., Documents/video.mp4, out of files displayed in the application program 152, the application program 152 provides the reproduction-related function and the local file path of the DRM media content data to the application interface part 210.

If the reproduction-related function is input, the application interface part 210 calls the security manager part 250 so as to check the security state of the terminal apparatus 140 (S304). The security manager part 250 checks whether the terminal apparatus is operated abnormally, i.e., whether an administrator right is acquired by illegally releasing or hacking a locking device of IPHONE of APPLE INC. or the ANDROID operating system (S406). If the terminal apparatus is operated abnormally, the security manager part 250 controls the decoding module part 166 so that the decoding operation is not carried out. In case that it is determined that the terminal apparatus 140 is operated normally, the local file path of the required DRM media content data input to the application interface part 210 is provided to the resource manager part 230.

The resource manager part 230 provides the local file path input to the license manager part 220, e.g., Documents/video.mp4, and then requests the confirming and issuing of the license for the required DRM media content data (S306).

Moreover, when the license for the required DRM media content data is confirmed, the resource manager part 230 converts the local file path of the required DRM media content data into the URL path for web server, and then requests the reproduction of URL for web server, e.g., http://localhost/xxxx_video.mp4 to the media player controller 240 (S308). Herein, the converting is a wide concept including the matching and all configurations which can use the URL for web server.

The media player controller 240 generates the object of a basic media device player 154 built in the terminal apparatus 140 and then provides it to the basic media device player 154. The basic media device player 154 generates the URL, e.g., GET/xxxx_video.mp4, and requests the required DRM media content data of, for example, 0-16384 bytes (S310).

If the required DRM media content data is required by the media device player 154, the web server module part 164 calls the security manager part 250 so as to check the security state. When the packet sniffing that taps the networking traffic in a loopback environment is detected (S312), the decoded media content data transmitted to the media device player 154 through the web server module part 164 may be leaked. Therefore, the security manager part 250 controls the decoding module part 166 so that the decoding operation is not carried out.

And if it is determined by the calling of the security manager part 250 that the terminal apparatus 140 is operated normally, the web server module part 164 obtains the local file path with respect to the URL for web server from the resource manager part 230.

If the local file path is received from the resource manager part 230, the file manager 264 of the web server module part 164 reads the DRM media content data stored in the local file memory 156 using the local file path (S316).

The web server module part 164 provides the read DRM media content data to the decoding module part 166. The decoding module part 166 requests the confirming of the license to the license manager part 220, and decodes the required DRM media content data using the desired encryption key (CEK) information from the license manager part 220 (S318).

The request handler 262 of the web server module part 164 transmits the decoded media content data to the media device player 154 (S320). In this case, the web server module part 164 transmits response information, for example, HTTP 200 OK and 0-16384 bytes to the media device player 154.

The media device player 154 reproduces the decoded media content received from the web server module part 164, and checks whether the media content is completely reproduced (S322). If the media content is completely reproduced, other media content is reproduced, or the reproduction of the media content is stopped. Otherwise, the media device player 154 continuously requests data of the same media content.

The DRM decoding method in the terminal apparatus shown in FIG. 3 can be provided in a state of being stored in a readable recoding medium. Herein, the readable recoding medium includes App Store that can purchase the application program.

According to the present invention, since the local web server module is provided in the terminal apparatus, it is possible to reproduce the DRM media content data in the terminal apparatus without the exclusive DRM decoding module.

While the present invention has been described with respect to the specific embodiments, it will be apparent to those skilled in the art that various changes and modifications may be made without departing from the spirit and scope of the invention as defined in the following claims.

What is claimed is:

1. A terminal apparatus with a DRM decoding function, comprising:
   a native unit provided with a local file memory storing DRM media content data, and an application program for driving a media device player using an operating system; and
   a DRM decoding unit configured to (a) read the DRM media content data from the local file memory using a web server type of URL path when the application program is to play the DRM media content data, (b) decode the read DRM media content data, and (c) provide the decoded DRM media content data to the media device player,
   wherein the DRM decoding unit is further configured to convert a local file path of the DRM media content data into a web server type of URL path when the application program is to play the DRM media content data and provide the web server type of URL path to the media device player, and
   wherein the DRM decoding unit is further configured to inversely convert the web server type of URL path into the physical local file path of the DRM media content data when the media device player is to play the DRM media content data, read the DRM media content data from the local file memory, and decode the read DRM media content data and then provide the decoded DRM media content data to the media device player,
wherein web server type URL paths are virtual paths.

2. The terminal apparatus of claim 1, wherein the DRM decoding unit comprises:
a decoding module part configured to decode the DRM media content data;
a resource manager part configured to convert the local file path of the DRM media content data into the web server type of URL path and then manage the web server type of URL path; and
a web server module part configured to receive the local file path of the DRM media content data corresponding to the web server type of URL path when the media device player is to play the DRM media content data, read the DRM media content data from the local file memory, decode the read DRM media content data using the decoding module, and then provide the decoded DRM media content data to the media device player.

3. The terminal apparatus of claim 2, wherein the web server module part comprises:
a request handler configured to provide the decoded media content data and HTTP response information in response to an HTTP (Hyper Text Transfer Protocol) range request from the media device player; and
a file manager configured to receive from the resource manager part the local file path of the DRM media content data corresponding to the web server type of URL path when a requirement for reproducing the DRM media content data is included in the HTTP range request, read the DRM media content data from the local file memory, decode the read DRM media content data using the decoding module, and then return the decoded DRM media content data to the request handler.

4. The terminal apparatus of claim 3, wherein the request handler is configured to check validity of the web server type of URL path including GUID (Globally Unique Identifier), as an OTP (OneTime Password) concept which is changed whenever the DRM media content data is played.

5. The terminal apparatus of claim 2, wherein the DRM decoding unit further comprises:
a license manager part configured to manage a license for the DRM media content data; and
a media player controller part configured to perform the reproducing and controlling of the media device player,
wherein the resource manager part is configured to provide the local file path of the DRM media content data to the license manager part so as to check whether there is a license, and then request the reproduction of the web server type of URL path to the media player controller part, when the license for the DRM media content data is normal.

6. The terminal apparatus of claim 5, wherein the decoding module part is configured to request the license manager part to check the license when the read DRM media content data is received from the web server module part, and receive a desired encryption key and then decode the read DRM media content data.

7. The terminal apparatus of claim 2, wherein the DRM decoding unit further comprises a download manager part configured to download the DRM media content data from an external server and then store the downloaded DRM media content data in the local file memory, and
wherein, when the application program is to play the DRM media content data, the web server module part is configured to check whether the download manager part completely downloaded the corresponding DRM media content data before reading the corresponding DRM media content data.

8. The terminal apparatus of claim 2, wherein the DRM decoding unit further comprises a security manager part configured to check whether the terminal apparatus is operated abnormally and then control the DRM media content data read from the decoding module part so as to be decoded or not decoded according to security rules, when the terminal apparatus is operated abnormally.

9. The terminal apparatus of claim 8, wherein the web server module part is configured to call the security manager part when the media device player is to play the DRM media content data, and control the DRM media content data read from the decoding module part so as to be not decoded when packet sniffing that traps the networking traffic in a loopback environment is detected.

10. The terminal apparatus of claim 1, wherein the DRM media content data is music downloaded to the device.

11. The terminal apparatus of claim 1, wherein the DRM media content data is playable audio.

12. The terminal apparatus of claim 1, wherein the DRM media content data is playable without using a proprietary DRM decoding module built into the terminal apparatus.

13. The terminal apparatus of claim 1, further comprising a local license store storing license data for at least some of the DRM media content data stored in the local file memory, the local license store being separate from the local file memory and the license data being separate from the DRM media content data, and
wherein the DRM decoding unit is further configured to inversely convert the web server type of URL path into the physical local file path of the DRM media content data when the media device player is to play the DRM media content data from the local file memory, read the DRM media content data from the local file memory using the physical local file path of the DRM media content data derived from the web server type of URL path as the location of the DRM media content data, and decode the read DRM media content data and then provide the decoded DRM media content data to the media device player for playback from the local file memory.

14. A DRM decoding method in a terminal apparatus that is provided with a local file memory for storing DRM media content data, and an application program for driving a media device player using an operating system, the method comprising:
a decoding step, using a web server type of URL path, of reading the DRM media content data from the local file memory using the web server type of URL path, when the application program is to play the DRM media content data, decoding the read DRM media content data, and then providing the decoded DRM media content data to the media device player,
wherein the decoding step using the web server type of URL path comprises:
converting a local file path of the DRM media content data into the web server type of URL path when the application program is to play the DRM media content data and then providing the web server type of URL bath to the media device player;
inversely converting the web server type of URL path into the local file path of the DRM media content data when the media device player is to play the DRM media content data, and reading the DRM media content data from the local file memory and then decoding the read DRM media content data; and providing the decoded DRM media content data to the media device player, and wherein web server type URL paths are virtual paths.

15. The DRM decoding method of claim 14, wherein the providing of the web server type of URL path to the media device player comprises providing the local file path of the DRM media content data so as to check whether there is a license, and then providing the web server type of URL path to the media device player when the DRM media content data is normally licensed.

* * * * *